(12) United States Patent
Handsaker et al.

(10) Patent No.: US 7,251,776 B2
(45) Date of Patent: Jul. 31, 2007

(54) SYSTEM AND METHOD FOR EFFICIENTLY AND FLEXIBLY UTILIZING SPREADSHEET INFORMATION

(75) Inventors: Robert Handsaker, Charlemont, MA (US); Gregory Rasin, Brookline, MA (US); Andrey Knourenko, Waltham, MA (US)

(73) Assignee: NetView Technologies, Inc., Charlemont, MA (US)

( * ) Notice: Subject to any disclaimer, the term of this patent is extended or adjusted under 35 U.S.C. 154(b) by 619 days.

(21) Appl. No.: 10/193,015

(22) Filed: Jul. 11, 2002

(65) Prior Publication Data
US 2003/0110191 A1 Jun. 12, 2003

Related U.S. Application Data

(60) Provisional application No. 60/305,217, filed on Jul. 13, 2001.

(51) Int. Cl.
*G06F 17/21* (2006.01)
(52) U.S. Cl. .................................................. 715/503
(58) Field of Classification Search .................. 715/503
See application file for complete search history.

(56) References Cited

U.S. PATENT DOCUMENTS

| 5,317,686 | A | * | 5/1994 | Salas et al. .................. 715/503 |
| 5,319,777 | A | | 6/1994 | Perez |
| 5,590,259 | A | | 12/1996 | Anderson et al. |
| 5,682,538 | A | | 10/1997 | Lemire et al. |
| 5,784,545 | A | | 7/1998 | Anderson et al. |
| 5,956,031 | A | | 9/1999 | Berteig et al. |
| 6,085,184 | A | * | 7/2000 | Bertrand et al. ............... 706/45 |
| 6,208,339 | B1 | | 3/2001 | Atlas et al. |
| 6,292,811 | B1 | * | 9/2001 | Clancey et al. ............. 715/503 |
| 6,631,497 | B1 | * | 10/2003 | Jamshidi et al. ............ 715/503 |
| 6,957,191 | B1 | * | 10/2005 | Belcsak et al. ............... 705/38 |
| 6,993,513 | B2 | * | 1/2006 | Beams et al. .................. 706/47 |
| 2002/0095399 | A1 | * | 7/2002 | Devine et al. .................. 707/1 |
| 2005/0182709 | A1 | * | 8/2005 | Belcsak et al. ............... 705/38 |

OTHER PUBLICATIONS

Blattner, Patrick, Special Edition Using Microsoft Excel 2002, Chapter 3—"Editing Spreadsheets," Chapter 19—"Outlining. Subtotaling, and Auditing Worksheet Data," and Chapter 25—Using Analysis Tools: Goal Seek, Solver, and Data Tables (© May 18, 2001).*

* cited by examiner

*Primary Examiner*—Doug Hutton

(57) ABSTRACT

In one aspect, the present invention relates to utilizing a spreadsheet by defining a parameter external to the spreadsheet and associating the parameter with the spreadsheet to define a parameterized workbook. In one embodiment, this utilization further comprises storing a location of the spreadsheet and storing the name of the parameter in the same storage module as the location. In another embodiment, it includes defining a result external to the spreadsheet, the result referencing one or more cells within the spreadsheet. In another embodiment, this utilization further comprises receiving a value for the parameter and generating the result based at least in part on the value and the spreadsheet. In another embodiment, it further comprises associating a type with the parameter. The type can define a range of values or attributes associated with the parameter.

34 Claims, 5 Drawing Sheets

SYSTEM AND METHOD FOR EFFICIENTLY AND FLEXIBLY UTILIZING SPREADSHEET INFORMATION

CROSS-REFERENCE TO RELATED APPLICATIONS

This application claims the benefit of and priority to the co-pending U.S. Provisional application Ser. No. 60/305,217, filed Jul. 13, 2001, entitled "System and Method for Efficiently and Flexibly Utilizing Spreadsheet Information," the entirety of which is incorporated herein by reference.

TECHNICAL FIELD

This invention relates generally to computer-based systems and methods for data processing, and more particularly relates to systems and methods for manipulating data, for example, spreadsheet application programs.

BACKGROUND

Generally, spreadsheet application programs are used to automate numerical and symbolic calculations for business, financial and scientific uses. Spreadsheet programs are the tools of choice for many business and analysis tasks because they combine a very usable graphical interface with a simple formula language that allows non-programmers, within the limits of the simple formula language, to create computational models.

Spreadsheet programs visually present numeric and non-numeric data in a two-dimensional grid for easy assimilation by the reader. Each element of the two-dimensional grid is referred to as a cell. A cell can contain either a data value, or it can contain a formula that calculates a new value based on the values of other cells. Spreadsheet cells that contain formulas are automatically recalculated when there are changes to the other cells that the formula depends upon. This mechanism allows a spreadsheet user to perform what-if scenarios only by modifying cell values and viewing or saving the effects of the changes.

Individual two-dimensional spreadsheets can be organized into a larger entity known as a notebook or workbook. The terms spreadsheet or worksheet will be used interchangeably herein, as will the terms notebook or workbook.

When worksheets are grouped together to form a workbook, the workbook and all of its worksheets are stored together as a single file (i.e. the workbook becomes the unit of storage and transfer when moving data between the program's memory space and disk storage). Formulas stored in worksheet cells can reference other cells that are in worksheets in the same workbook and/or cells that are in worksheets in a different workbook. When formulas refer to a different workbook, however, known prior art spreadsheet programs cannot automatically recalculate formula values unless that other workbook has also been loaded into the program's memory space. These prior art spreadsheet programs do not allow multiple copies of the same workbook to be loaded into memory simultaneously and they do not allow multiple what-if scenarios to be calculated simultaneously.

In existing spreadsheet programs, data values can be stored in cells either by user input (directly or through a user-input formula) or by the user associating the cells with an external data source, such as a query to a database. When cells are associated with an external data source, the user of the program can control how often the external data source should be checked for changes. However, no mechanism exists to automatically detect when data referenced from the data source has changed and to recalculate the spreadsheet if, and only if, such a change has occurred.

Spreadsheets in prior art spreadsheet programs perform at most a single calculation with fixed inputs to arrive at a fixed set of answers. Changes in external data sources can affect the results of computations performed by a spreadsheet, but the computation itself is fixed. Prior art spreadsheet programs make the user vary cell values if the user wants to perform different calculations, including what-if scenarios.

Some prior art spreadsheet programs support various facilities for programmatic control over the spreadsheets to automate spreadsheet tasks. Some of these programs implement a macro recording and playback facility, which allows repetitive tasks to be automated by recording the user's actions and later replaying them. Some programs publish application programming interfaces (APIs) that allow computer programs to be written to manipulate the spreadsheets or to extend the user interface of the program. Because programming skills are required to use these application programming interfaces, they are not used by most spreadsheet users.

Some prior art spreadsheet programs cache internally the results of intermediate calculations (cell values) to improve the speed of recalculation. Prior art spreadsheet programs support re-execution of external data queries either when manually requested, on a periodic basis while the workbook is loaded into the program's memory, or whenever the workbook is opened. None of these methods are optimal, and none of these methods are effective when the spreadsheet program is not running.

SUMMARY

In one aspect, the present invention relates to a method for utilizing a spreadsheet. The method comprises defining a parameter external to the spreadsheet and associating the parameter with the spreadsheet to define a parameterized workbook. In one embodiment, the method further comprises storing a location of the spreadsheet and storing the name of the parameter in the same storage module as the location. In another embodiment, the method further comprises defining a result external to the spreadsheet, the result referencing one or more cells within the spreadsheet. In another embodiment, the method further comprises receiving a value for the parameter and generating the result based at least in part on the value and the spreadsheet. In another embodiment, the method further comprises defining a format for the result. In another embodiment, the method further comprises associating a type with the parameter, the type defining a range of values.

In another embodiment, the method further comprises associating a type with the parameter, the type defining attributes associated with the parameter. In another embodiment, the method further comprises defining a formula within the spreadsheet using the parameter. In another embodiment, the method further comprises binding a value of the parameter to an instance of the associated spreadsheet. In another embodiment, the parameterized workbook is a first parameterized workbook, and the method further comprises defining a second parameterized workbook and referencing a result from the second parameterized workbook in a formula in the first parameterized workbook. In another embodiment, the method further comprises storing, separate from the spreadsheet and after the spreadsheet closes, an intermediate value used in a calculation for the spreadsheet and associating the intermediate value with the spreadsheet and a value of the parameter used to calculate the intermediate value.

In yet another embodiment, the method further comprises automatically calculating a result associated with the spreadsheet without opening the spreadsheet by using the stored intermediate value. In another embodiment, the method further comprises distributing calculations of the spreadsheet among a plurality of computing devices. In another embodiment, the method further comprises distributing calculations of the spreadsheet among a plurality of computing devices based at least in part on one or more formulas in the spreadsheet. In another embodiment, the method further comprises distributing the calculations of the spreadsheet among a plurality of computing devices based at least in part on one or more stored associations in a database associated with the parameterized workbook.

In another aspect, the invention relates to a system for utilizing a spreadsheet. The system comprises a spreadsheet and a list of parameters. The spreadsheet comprises one or more associated formulas. The list of parameters is associated with the spreadsheet. The list of parameters is external to the spreadsheet and one or more parameters within the list are referenced in the one or more associated formulas of the spreadsheet. In one embodiment, the system further comprises a storage module to store a location of the spreadsheet and store the name of each parameter in the associated list of parameters. In another embodiment, the system further comprises a list of results associated with the spreadsheet. In another embodiment, the system further comprises a calculation module to receive a value for a first parameter within the list of parameters and generate a first result based at least in part on the value and the spreadsheet. In another embodiment, the system further comprises an instantiator module to bind a value of a first parameter within the list of parameters to an instance of the spreadsheet. In another embodiment, the spreadsheet is a first spreadsheet and the system further comprises a second spreadsheet having one or more formulas referencing a result from the first spreadsheet.

In another aspect, the invention relates to a method for utilizing a plurality of spreadsheets. The method comprises defining a parameter and defining a set of one or more selection rules to select a first spreadsheet from a plurality of spreadsheets based at least in part on a value of the parameter, thereby defining a virtual workbook. In one embodiment, the method further comprises selecting a first workbook from the plurality of workbooks based at least in part on a value for the parameter and the set of one or more rules. In another embodiment, the method further comprises referencing the virtual workbook in a created spreadsheet as a substitute for a second spreadsheet in the plurality of spreadsheets. In another embodiment, the method further comprises defining a result external to the virtual workbook, the result referencing one or more cells within each spreadsheet in the plurality of spreadsheets.

In another embodiment, the method further comprises receiving a value for the parameter and generating the result based at least in part on the value and the first spreadsheet. In another embodiment, the method further comprises defining a format for the result. In another embodiment, the method further comprises associating a type with the parameter, the type defining a range of values. In another embodiment, the method further comprises associating a type with the parameter, the type defining attributes associated with the parameter. In another embodiment, the method further comprises defining a formula containing the parameter within a spreadsheet in the plurality of spreadsheets. In another embodiment, the method further comprises binding a value of the parameter to an instance of the selected first spreadsheet. In another embodiment, the virtual workbook is a first virtual workbook and the method further comprises defining a second virtual workbook and referencing a result from the second virtual workbook in a formula in the first virtual workbook. In another embodiment, the method further comprises defining a parameterized workbook and referencing a result from the parameterized workbook in a formula in the virtual workbook. In another embodiment, the method further comprises defining a parameterized workbook and referencing a result from the virtual workbook in a formula in the parameterized workbook.

In another embodiment, the method further comprises storing, separate from the first spreadsheet and after the first spreadsheet closes, an intermediate value used in a calculation for the first spreadsheet and associating the intermediate value with the first spreadsheet and a value of the parameter used to calculate the intermediate value. In another embodiment, the method further comprises automatically calculating a result associated with the first spreadsheet without opening the first spreadsheet by using the stored intermediate value. In another embodiment, the method further comprises distributing calculations of the first spreadsheet among a plurality of computing devices. In another embodiment, the method further comprises distributing calculations of the first spreadsheet among a plurality of computing devices based at least in part on one or more formulas in the first spreadsheet. In another embodiment, the method further comprises distributing the calculations of the first spreadsheet among a plurality of computing devices based at least in part on one or more stored associations in a database associated with the virtual workbook.

In yet another aspect, the invention relates to a system for utilizing a plurality of spreadsheets. The system comprises a list of parameters and a selection module. The selection module selects a first spreadsheet from a plurality of spreadsheets. In one embodiment, the system further comprises a list of results associated with each of spreadsheets in the plurality of spreadsheets. In another embodiment, the system further comprises a calculation module to receive a value for a first parameter within the list of parameters and generate a first result based at least in part on the value and the first spreadsheet. In another embodiment, the system further comprises an instantiator module to bind a value of a first parameter within the list of parameters to an instance of the first spreadsheet. In another embodiment, the spreadsheet is a first spreadsheet and the system further comprises a second spreadsheet having one or more formulas referencing a result from the first spreadsheet. In another embodiment, the system further comprises a storage module to store a location of each of the spreadsheets in the plurality of spreadsheets and store the name of each parameter in the associated list of parameters.

In another aspect, the invention relates to a method for storing information associated with a spreadsheet. The method comprises storing a location of a reference spreadsheet and storing a list of parameters associated with the reference spreadsheet. In one embodiment, the method further comprises storing, separate from the reference spreadsheet and after the reference spreadsheet closes, an intermediate value used in a calculation for a reference spreadsheet and associating the intermediate value with the reference spreadsheet and a value of a parameter from the list used to calculate the intermediate value. In another embodiment, the method further comprises automatically calculating many workbook results by enumerating lists of legal parameter values based on type information associated with each respective parameter. In another embodiment, the method further comprises automatically calculating a result associated with the reference spreadsheet without opening the reference spreadsheet by using the stored intermediate value. In another embodiment, the method further comprises storing a list of outputs associated with the reference spreadsheet.

In yet another embodiment, the method further comprises storing an association of the reference spreadsheet to another spreadsheet upon which the reference spreadsheet depends. In another embodiment, the method further comprises monitoring the another spreadsheet to detect a change within an output. In another embodiment, the method further comprises automatically performing a calculation using the reference spreadsheet in response to detecting the change within the output of the another spreadsheet. In another embodiment, the method further comprises storing an association of the reference spreadsheet to a data source upon which a formula in the spreadsheet depends. In another embodiment, the method further comprises monitoring the data source to detect a change within the data source. In another embodiment, the method further comprises automatically performing a calculation using the reference spreadsheet in response to detecting the change within the data source.

In another embodiment, the method further comprises storing version data associated with the reference workbook. In another embodiment, the location comprises a network address. In another embodiment, the method further comprises distributing calculations among a plurality of computing devices based at least in part on one or more stored associations. In another embodiment, the method further comprises distributing calculations of the reference spreadsheet among a plurality of computing devices. In another embodiment, the method further comprises distributing calculations of the reference spreadsheet among a plurality of computing devices based at least in part on one or more formulas in the reference spreadsheet. In another embodiment, the method further comprises distributing the calculations of the reference spreadsheet among a plurality of computing devices based at least in part on one or more stored associations in a database associated with the reference spreadsheet.

In a further aspect, the invention relates to a method for utilizing a spreadsheet. The method comprises defining a parameter associated with the spreadsheet and generating a data query based at least in part on the parameter. In one embodiment, the method further comprises generating an output based at least in part on the results of the data query.

In another aspect, the invention relates to a method for utilizing a spreadsheet. The method comprises defining a template within the spreadsheet and generating an output based at least in part on the template. In one embodiment, the method further comprises generating a data query based at least in part on a parameter associated with the spreadsheet. In another embodiment, the one or more cells within the template contain formulas. In another embodiment, the formulas are written in spreadsheet formula language. In another embodiment, the method further comprises replicating one or more cells within the template. In another embodiment, the method further comprises preserving relative cell references. In another embodiment, the method further comprises replicating formatting of the template cells.

In yet another embodiment, the method further comprises associating values from a data query with the one or more replicated cells by using column names in formulas within the one or more replicated cells and performing calculations using the associated values. In another embodiment, the method further comprises performing special processing on the output when the data query returns no associated values. In another embodiment, the method further comprises automatically sorting the output based at least in part on the associated values of the one or more cells in the output. In another embodiment, the method further comprises associating a formula language name with the output. In another embodiment, the method further comprises automatically updating the output when a change is detected. In another embodiment, the change comprises a change to i) template cell formulas, ii) template cell formatting, iii) template cell values, or iv) data query parameters.

In another aspect, the invention relates to another method for utilizing a spreadsheet. The method comprises defining an output range within the spreadsheet, rendering the output range and allowing a user to modify the rendered output range. In one embodiment, the method further comprises rendering the output range using HTML. In another embodiment, the method further comprises allowing the user to sort columns within the output range using a user input. In another embodiment, the method further comprises allowing a user to interactively expand and collapse a hierarchy using a user input.

In yet another aspect, the invention relates to an article of manufacture comprising one or more computer program portions embodied therein to cause a processor to perform each of the methods above.

Among other advantages, the invention described above allows non-programmers greater flexibility, including allowing the application of spreadsheets to certain kinds of business problems that are not tractable with conventional spreadsheet programs. The present inventions derive, in part, from the observation that currently available spreadsheet systems do not meet the needs of users who would like to use spreadsheet based systems to solve these kinds of problems.

The spreadsheet-based data processing systems efficiently perform large business and financial computations based on a network of inter-related spreadsheets. The systems include spreadsheet modeling mechanisms that work in concert to allow non-programmers to model classes of problems that are intractable using prior art spreadsheet programs. One example of a business problem is the use of spreadsheets to manage sales commission programs. In a typical situation, each salesperson's commission plan may be based on several variables, such as sales quota goals or particular commission rates to be paid on certain sales. Each salesperson's plan may also vary based on their seniority or the kind of territory they cover. In current practice, compensation specialists often model the commission plans using spreadsheets. Ideally, each salesperson will have a separate spreadsheet customized to their situation. Managers will also have their own tailored commission plans, modeled as a spreadsheet, and these will often depend on the results of the people reporting to them. The result is a computational model that consists of a large web of interdependent spreadsheets, which can number in the thousands for a large sales organization.

Existing spreadsheet programs lack effective end-user automation functionality to deal with models of this scale and complexity. These models may not be able to fit into the memory space of the program, and so must be broken up into multiple workbooks. Conventional programs allow for only manual management of the dependencies between the resulting workbooks, leading to mistakes. The complexity of the models makes them difficult to change without introducing errors in the references between workbooks. The methods and systems described above include the concept of a parameterized spreadsheet, which greatly facilitates the reuse of spreadsheets as building blocks in large computations, and automated parameter-sensitive dependency tracking, which reduces errors caused by unintended sharing of workbooks or the failure to load a dependent spreadsheet into memory or to recalculate it when necessary, for example because the data in a referenced data source has changed.

Moreover, existing spreadsheet calculation algorithms do not work efficiently with large models that may contain hundreds or thousands of workbooks. The methods and systems described above allow large and complex spreadsheet models to be efficiently recalculated and maintained. The ability to quickly perform recalculations in turn makes it practical to perform large what-if scenarios and to deliver on-demand calculations.

The methods and systems described above also allow these large spreadsheet calculations to be kept up to date and to be reported upon without user intervention. The results of the computations can be made available on demand, even in the face of continual changes to the underlying data and the evolution of the spreadsheets themselves. The ability to access these spreadsheet models on demand allows self-service applications to be created for information consumers. For example, using a self-service web site, a salesperson can access their current commission calculations or a chief financial officer can view and download an up to date projection of the commission expenses for the current quarter.

The specification frequently refers to a sales commission model to provide examples of the inventive techniques described herein. It is understood, however, that the present invention is not limited in scope to the provided example of sales commission calculations. The present invention is applicable to many other application domains including, but not limited to, financial services, logistics and process modeling. In the domain of financial services, the present invention may be applied to build, manage and calculate models to determine portfolio valuations or to guide securities or commodity trading based on spreadsheet models developed by the user. In the logistics and process modeling domains, the present invention may be used to apply user developed spreadsheet models to optimize the efficiency of a manufacturing facility or a transportation network.

In some embodiments, the invention relates to systems and methods for spreadsheet data processing that applies parameter controlled spreadsheet workbooks to specific data. When a workbook is applied to data sources and parameters for the workbook are selected (if necessary), the system and method performs the workbook calculations upon the data sources and subsidiary workbooks (if any) to produce calculated results. Such results, in one embodiment, can be manifested in any of several different formats.

Each workbook may make reference to subsidiary workbooks, which may be applied when the parent workbook is applied. Each applied workbook or subsidiary workbook may be controlled by supplied parameters. The parameters may control the selection and application of each subsidiary workbook. Applied workbooks may reference subsidiary workbooks multiple times with different parameter values and may make recursive self references with different parameters. A family of workbooks with similar parameters may be grouped to form a virtual workbook that uses a set of supplied rules to select one member of the family when the virtual workbook is applied.

Workbook parameters may be typed, and the type may limit the supplied values. Workbook and data dependencies are tracked in order to facilitate the maintenance of workbooks and data. The systems or methods may provide caching of intermediate computations across workbooks and data sources and may distribute computations across multiple computers. Specific sets of cached results may be constantly maintained and made available as a multidimensional data source (e.g. as time series data).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
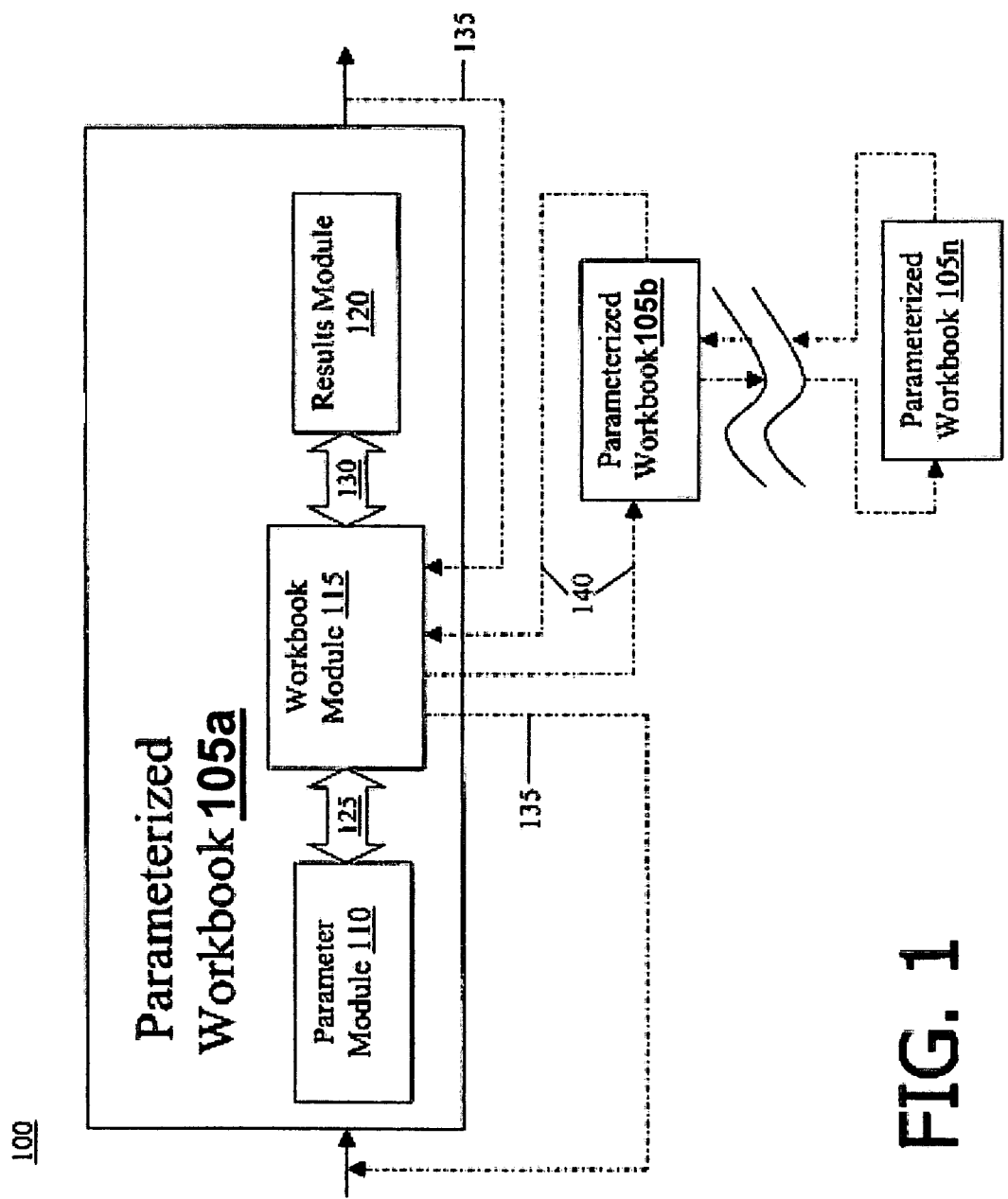
FIG. 1 is a block diagram of an illustrative embodiment of a complex model comprising parameterized workbooks in accordance with the invention.

FIG. 1 is a block diagram of an illustrative embodiment of a complex model 100 comprising a first parameterized workbook 105*a*, and optionally, a second parameterized workbook 105*b* and an nth parameterized workbook 105*n*. The parameterized workbooks 105*a*, 105*b* . . . 105*n* are referred to generally as 105. The first parameterized workbook 105*a* includes a parameter module 110, a workbook module 115 and a results module 120. The parameter module 110 can include a list of one or more parameters (e.g., external inputs). The results module 120 can include a list of one or more results (e.g., outputs). Results 120 can include, for example, a single value retrieved from a workbook cell, an array of values taken from a region of workbook cells, an HTML rendering of a region (e.g. the print area) of a sheet from a workbook and/or an image or an alternative representation describing a chart. The arrow 125 represents the association of a particular parameter 110 with a particular workbook 115. Similarly, the arrow 130 represents the association of a particular result with a particular workbook 115. The parameterized workbook 105 is a basic building block and as illustrated, can call itself (represented by path 135) and/or a second parameterized workbook 105*b* (represented by path 140) to model complex calculations. The modules throughout the specification can be implemented as a software program (e.g., a set and/or a sub-set of processor instructions and the like) and/or a hardware device (e.g., ASIC, FPGA, processor, memory, storage device and the like).

A creator (e.g., user, administrator, system and/or automated process) associates the parameter module 110 and the results module 120 with the workbook module 115. This association can facilitate the reuse of workbook calculations in different contexts. A system, for example as described in FIG. 3 below, stores the lists of parameters 110 and results 120, and the types of these parameters 110 and results 120, in a storage module 315 (FIG. 3), for example, a database. By associating parameters 110 and results 120 with each workbook 115, a single workbook 115 can perform a potentially unlimited number of calculations. This allows a parameterized workbook 105 to become a reusable computational building block in constructing a larger model 100.

The creator can also associate type information with each workbook parameter 110 and result 120. The type information constrains the set of legal data values the system can use for a parameter 110 when instantiating a workbook and the set of legal data values that the system can return as an output result 120 from a workbook 105 instantiation.

The parameter 110 and result 120 values of a parameterized workbook 105 can be scalar types, such as strings and numbers, and/or elements of structured data types such as records or objects. Parameter 110 and result 120 values can also be arrays of values derived from ranges of cells, which need not be contiguous. In one embodiment, the types associated with the parameters 110 and results 120 are described by an object-oriented type system that can represent objects with data fields, methods, inheritance and information hiding capabilities.

For example, a parameter can be a person type parameter. A person type parameter can include attributes such as personal information, title, supervisor, and compensation information. The personal information can include the attributes First Name, Last Name, Social Security Number, Login ID, Password, Employee No., Work phone, Home phone and Date of hire. The compensation information can include the attributes Base Salary and Effective Date. For ease of use, the system can employ a user interface for defining the attributes for specific employees of an organization. For example, a user can input a value for the attribute Title using a pull-down menu including the values, for example, Sales Rep, District Manager, Regional Manager, Vice President-Sales, Strategic Account Manager, Director-Strategic Accounts, CEO, and Commission Administrator. The Supervisor attribute can be a pointer to existing instances of person type parameters.

The type system of the parameterized workbook 105 also captures data source mapping information about how object and record types relate to data sources. Object or record types can optionally be mapped to the database schema of a data source, which can be either an internal data source (e.g., part of the system embodying the present invention) or an external data source. The data source mapping information is sufficient to allow the system to perform queries against the data source and to enumerate and access all instances of the object or record type available from the data source. The type system can combine the data source mapping information with the object or record type information to express arbitrary filters or restrictions on the set of object or record types. The type system provides the ability to express data dependent constraints on workbook parameters 110 and return values 120. In one embodiment, the system includes built-in primitives for describing constraints based on roles or hierarchies (e.g. Person where Person HasRole Sales-Manager and Person.Territory IsIn Europe).

The type information associated with each parameterized workbook 105 can be created from a combination of user input and from a programmatic examination of the internal structure of the computations. The system can employ type inference methods for determining type information based on an analysis of the static structure of a computation (such as the static structure of a computer program) as is known in the art.

The system uses the type information to constrain the legal instantiations of a parameterized workbook 105. For example, a particular workbook 105a might have two parameters 110. The first parameter 110 is typed as the person object, further constrained to have the job title of telesales representative. The second parameter 110 is typed as a time period object, further constrained to be a calendar month. The workbook 105a might define several outputs 120. One output 120 might be a bar chart indicating sales performance of the sales person for a particular month (the output type might be specified as a GIF image). Another output might be a list of daily sales performance metrics (such as the number of calls or average call duration or product revenue generated). The type of this second output might be an array of numeric values (one for each day of the month).

The system can use parameter type information to avoid a common source of user errors when creating, modifying or accessing computations. For example, based on the available type information for the workbook described above, the system can automatically generate a user interface to prompt the user for a telesales representative (chosen from a list of all such people known to the system) and a month (based on the months for which the system has data). The system can also use spreadsheet parameter information 110 for other purposes, including for example, data dependency tracking and pre-computation and caching of result sets 120, as described below.

In one embodiment, the system receives an XML file to create a parameterized workbook 105. For example, the XML file can be defined as follows:

```
<NVWorkbook name="Rep_ProductLineCommissionCalculations"
    file="/workbooks/Rep_ProductLineCommissionCalculations.xls">
  <paramdef type="Person" name="person"/>
  <paramdef type="Year" name="period"/>
  <attr name="CreatedBy" value="Chris Thompson"/>
  <attr name="Description" value="Workbook calculates earned
  commissions for all 12 months of a Year for two product lines." />
  <output name="YTDCommission" cell="Commission_YTD">
</NVWorkbook>
```

In this example, the file names the parameterized workbook 105 "Rep_ProductLineCommissionCalculations." In addition to the name, the parameterized workbook 105 has two additional attributes, "created by" and "description." In one embodiment, the system can provide a user interface that lists the respective values for these three attributes for all of the parameterized workbooks 105 in the system. The file also defines the workbook module 115 used for this parameterized workbook 105. This workbook is "/workbooks/Rep_ProductLineCommissionCalculations."

This example file names the parameters 110 associated with the parameterized workbook 105 Rep ProductLineCommissionCalculations "person" and "period" and defines them as "Person" and "Year" types, respectively. Person and Year have definitions in a data dictionary that describes the object model of the application. In this example, the association 125 of the parameter 110 with the workbook 115 is made in the workbook itself in addition to being described in the file. In other words, the spreadsheet Rep_ProductLineCommissionCalculations contains formulas that use the parameters person and period in them. When the system instantiates the parameterized workbook 105, the system binds specific values for these parameters to the instantiation of the Rep_ProductLineCommissionCalculations spreadsheet.

This example file names the output 120 "YTDCommission." Other parameterized workbooks 105 can use this name in their formulas and the system can find this value and pass this value to those other workbooks 105. As described below, the system can store this value so that the other workbooks can receive this value without having to re-instantiate the Rep_ProductLineCommissionCalculations workbook 105. In this example, the file defines the association 135 between the output 120 and the workbook module 115. The file associates this output 120 with the cell named "Commission_YTD."

An output such as "YTDCommission" also defines a family of related output values based on all possible combinations of input parameters to the parameterized workbook 105. Sets or subsets of these families of output values can be used as multi-dimensional data cubes for analyzing trends and data relationships as is known in the art. An example of a subset of values derived from this example workbook is the list of YTDCommission values for all sales managers in Europe for the year 2000.

In one embodiment, the creator associates the parameter module 110 and the results module 120 with a workbook module 115 that includes a workbook (which can contain multiple worksheets). A workbook is used because the workbook is a convenient unit of spreadsheet computation, easily identifiable and manageable by the user. The system, however, does not depend on certain properties of workbooks manifested in current spreadsheet programs, such as the workbook being the unit of file storage and the unit of transfer when moving a spreadsheet computation into main memory for processing. In other embodiments, the workbook module 115 can include any logical unit of spreadsheet computation, comprising one or more spreadsheets and associated formulas, as the unit of parameterization. Therefore, although workbook is used for clarity, the term workbook can be substituted with this logical unit of spreadsheet computation throughout the specification.

With parameterized workbooks 105, a user does not have to vary cell values in order to perform different calculations, including what-if scenarios. Using parameterized workbooks 105, a system can perform these variable calculations non-interactively (e.g., without intervention by an user). As described in more detail below, a system can perform a varying parameterized workbook 105 calculation on a client computer or on one or more server computers. An end user, a formula appearing in a workbook cell, and/or a program using an API can initiate a parameterized workbook 105 calculation either interactively or non-interactively. Other computer systems communicating over a network can also initiate a parameterized workbook 105 calculation. These other systems may use established communication protocols such as, for example, CORBA (Common Object Request Broker, from OMG (Object Management Group)), RMI (Java Remote Method Invocation) or SOAP (Simple Object Access Protocol, from Microsoft). A parameterized workbook 105 calculation may be initiated in response to a user request from a web browser or another user interface device include cell phones, personal digital assistants, etc.

In one embodiment, the creator of the parameterized spreadsheet 105 limits the variable calculations to a subset. Parameterized spreadsheet 105 calculations may limit the variations to a list of specific parameters 110 and to a potentially limited set of possible values for each parameter 110.

The output 120 of a parameterized spreadsheet 105 calculation can take many forms. The software performing the parameterized spreadsheet 105 calculation can format a worksheet or a region on a worksheet for display on some output device. The display format can vary depending on the output device, and can include standardized output formats such as HTML (Hypertext Markup Language, the main document format recognized by web browsers), WML (Wireless Markup Language, similar to HTML but targeted at wireless devices such as cell phones), or XML (extensible Markup Language, used for business to business (or system to system) communication), in addition to device specific formats. Alternatively, the output 120 of a parameterized spreadsheet 105 calculation can be a set of data values, suitable for use in further data processing. Various output formats can be used for representing these sets of data values 120, including document formats such as HTML or XML or formats based on data communication protocols such as CORBA or RMI. Parameterized spreadsheets 105 allow greater control over the course of the computation, including the ability to select different sets of external data upon which to operate.

Parameterized spreadsheets 105 allow computations to be performed and allow those computations to be influenced by external data sources through parameters, data ranges, and other mechanisms as described below. They provide increased flexibility to the user, allowing computations to use varying inputs and allowing the output desired to be specified by the user without having to change the underlying spreadsheet 115. Introducing parameterized spreadsheets 105 as a formal modeling mechanism provides an interface suitable for non-programmers to create reusable spreadsheet-based computational building blocks and it provides programmers with increased flexibility and power.

When a parameterized workbook 105 calculation is performed in the context of a specific set of parameters 110, this can be referred to as a workbook instantiation. As illustrated with path 135, a model 100 can simultaneously instantiate a parameterized workbook 105a multiple times with different values for the parameters 110. This allows a parameterized workbook 105 calculation to depend on one or more calculations from subsidiary parameterized workbooks (e.g., 105a, 105b . . . 105n). Any subset of the subsidiary instantiations, and even the referencing workbook instantiation itself, can be instantiations of the same parameterized workbook 105.

Figure 4:
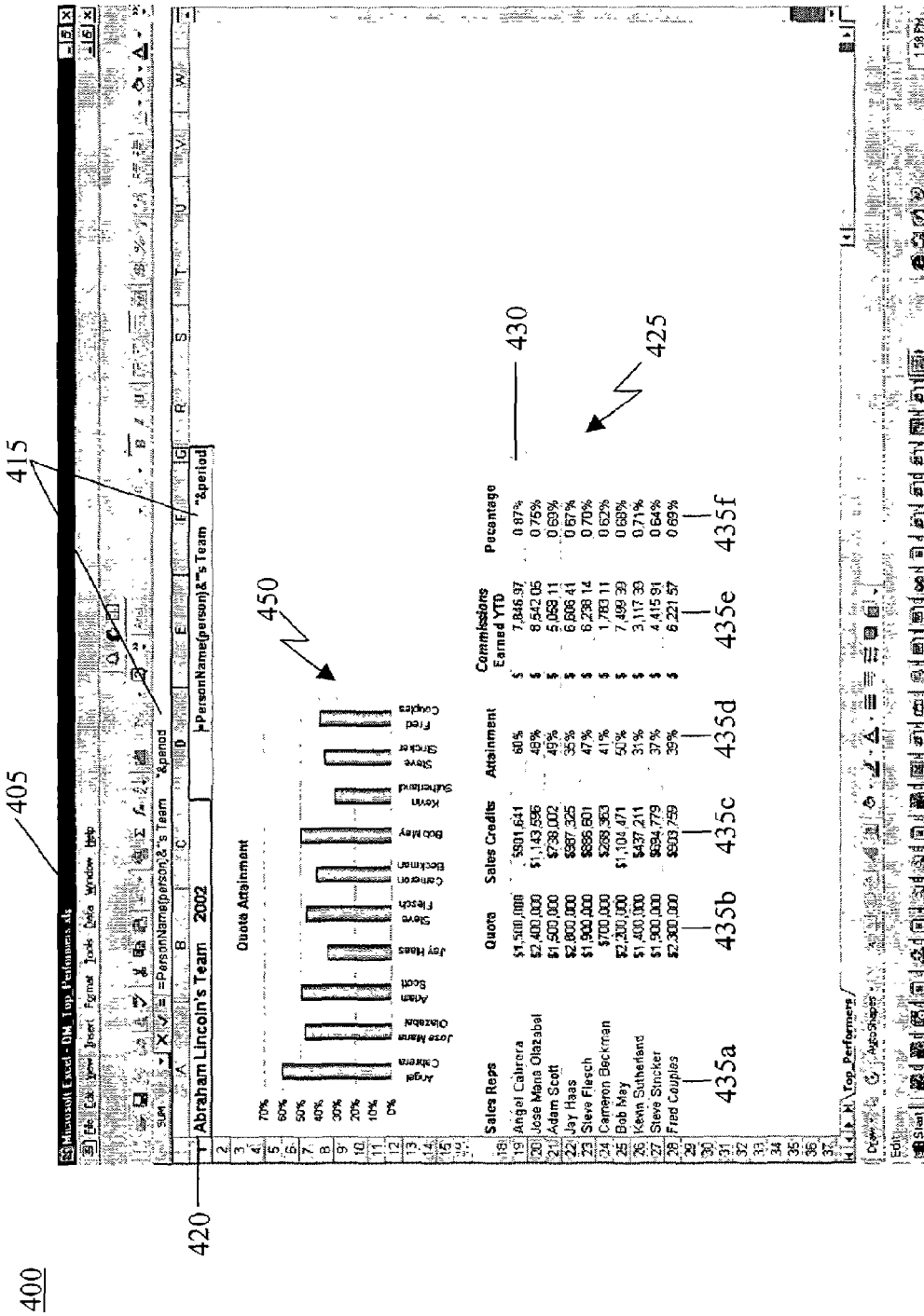
FIG. 4 is a screen shot of an illustrative embodiment of a parameterized workbook in accordance with the invention.

The combination of parameterized spreadsheets 105 and simultaneous instantiation allow many business problems to be modeled naturally by the end user. For example, if a sales manager is paid based on the performance of the salespeople who report to him, and if each salesperson's performance is determined by a parameterized spreadsheet 105 calculation, then the manager's performance can be modeled 100 by a parameterized spreadsheet 105a that depends upon values calculated by subsidiary workbook instantiations (e.g., 105b . . . 105n). The number of dependent instantiations and the parameters 110 used in each instantiation are controlled by the formulas in the referencing workbook 115, perhaps for example, based on a database representation of the organizational structure of the company. As described in more detail below, FIG. 4 illustrates an exemplary embodiment of a screenshot of a parameterized workbook 105.

Figure 2:
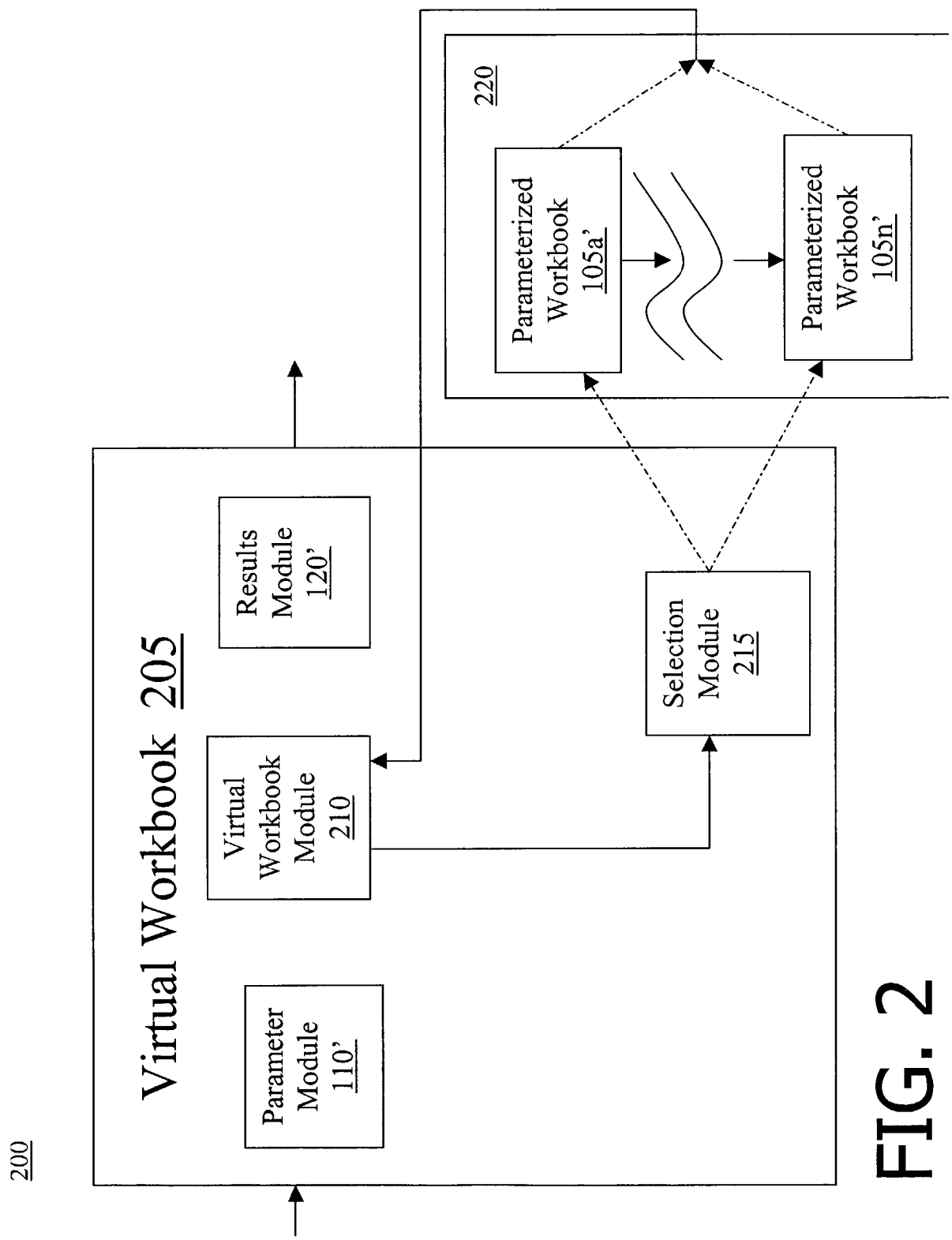
FIG. 2 is a block diagram of an illustrative embodiment of a virtual workbook in accordance with the invention.

In addition to the parameterized workbook 105, FIG. 2 illustrates an exemplary embodiment 200 of another building block for use in complex modeling, the virtual workbook 205. The virtual workbook 205 includes a parameter module 110', a results module 120', a virtual workbook module 210 and a selection module 215. In one embodiment, the selection module 215 can be included in and/or as part of the virtual workbook module 210. An instantiation of the virtual workbook 205 selects a concrete workbook (e.g., 105a' . . . 105n') to instantiate based on the values of the supplied parameters 110' and a set of rules 215 associated with the virtual workbook 205. The virtual workbook 205 mechanisms are similar to programming language polymorphism mechanisms, such as virtual methods or function overloading, that are a part of programming languages such as Java or C++.

As described above, a parameterized workbook 105a (FIG. 1) creates a set of outputs 120 (FIG. 1) based on a set of input parameters 110 (FIG. 1). In other words, the parameterized workbook 105a is a function mapping a set of inputs 110 to a set of outputs 120. The outputs 120 may be visual, such as a chart or a report rendered in some format (e.g. GIF, HTML) intended for display or printing. The outputs 120 may also be data values represented in some format (e.g. XML) intended for further processing.

A virtual (polymorphic) workbook 205 maps a set of inputs 110' to a set of outputs 120' by selecting a concrete parameterized workbook (e.g., 105a' . . . 105n', generally 105') from among a set 220 of compatible workbooks and then instantiating the concrete workbook 105'. The selection module 215 selects a concrete workbook 105' based on the value of the parameters 110' the virtual workbook 205 receives and a set of rules 215 associated with the virtual workbook 205. As an example, a virtual workbook 205 can represent monthly commission payments to sales employees. Different kinds of employees might have different sales plans depending on their job title, seniority, territory, and the like, and the parameterized workbook 105 for different employees might be different for different months, for example, because they were promoted. The selection module 215 selects a concrete parameterized workbook 105' based on received values of parameters 110' corresponding to job title, seniority, territory, month, and the like. The virtual workbook 205 provides a uniform mechanism of determining any employee's commission payment for any particular month, while the underlying set of concrete parameterized workbooks 220 allow for the differences in the actual calculations for the different employees or different months.

In one embodiment, virtual workbooks 205 (as well as concrete workbooks 105) are associated with uniform resource locators (URLs), which are part of the naming scheme used in the World Wide Web. The particular naming scheme used to refer to workbooks 105, 205 does not matter, however, since the virtual workbooks 205 themselves provide the mechanism for mapping a generic request to a specific workbook 105' that implements that request for a given set of parameters 110'.

A model can employ a virtual workbook 205 in any context where a parameterized workbook 105 can be used. For example, a virtual workbook 205 may be referenced by formulas within other workbooks (this reference may be based on the URL associated with the workbook or it may be based on a different naming scheme not based on URLs). As a result, a parameterized workbook 105' may have a dependency on a virtual workbook 205 that is in turn implemented by one or more concrete workbooks 105', perhaps including the referencing workbook 105' itself. This mechanism allows the formulas in the referencing workbook 105' to refer transparently to one of several concrete workbooks 105' that the virtual workbook 205 selects based on the value of the parameters 110' the virtual workbook 205 receives. A user or the system can add and/or change over time the set of rules 215 for selecting a concrete workbook 105' and the set 220 of concrete workbooks. These changes are transparent to a referencing (calling) workbook and so the user or system does not need to change the formulas within the referencing workbook. This transparency makes a virtual workbook 205 a powerful building block to allow end users to create and manage large, flexible spreadsheet-based computations.

Similar to the parameterized workbook 105, in one embodiment, the system receives an XML file to create a virtual workbook 205. For example, the XML file can be defined as follows:

```
<NVQuantity name="CommissionEarnedYTD" type="ByDecisionTree">
    <paramdef type="Person" name="person"/>
    <paramdef type="Year" name="period"/>
    <paramdef type="MonthIndex" name="monthindex"/>
    <NVDecisionTree>
        <NVRule>
            <NVRulet parameter_name="person">
                <NVCondition type="attr" attr="Position"
                    value="Sales Rep"/>
                <NVCondition type="attr" attr="Position"
                    value="District Manager"/>
                <NVCondition type="attr" attr="Position"
                    value="Regional Manager"/>
            </NVRulet>
            <NVQuantityImpl type="ByCellName"
                valueType="Real">
                <NVCell name="Commission_YTD"
workbook="Rep_ProductLineCommissionCalculations"/>
            </NVQuantityImpl>
        </NVRule>
        <NVRule>
            <NVRulet parameter_name="person">
                <NVCondition type="attr" attr="Position"
                    value="Strategic Account Manager"/>
            </NVRulet>
            <NVQuantityImpl type="ByCellName"
                valueType="Real">
                <NVCell name="Commission_YTD"
workbook="SAM_ProductLineCommissionCalculations"/>
            </NVQuantityImpl>
        </NVRule>
    </NVDecisionTree>
</NVQuantity>
```

The file in this example names this virtual workbook 205 "CommissionEarnedYTD" and defines the type of the virtual workbook 205 as "ByDecisionTree." As defined in this example, the selection module 215 uses the two rules of the decision tree to select the appropriate concrete parameterized workbook 105'. Both rules examine the parameter 110' named "person" and the value of its attribute "position." According to the first rule, if the value of the position attribute is sales rep, district manager or regional manager, the selection module 215 selects the parameterized workbook 105' Rep_ProductLineCommissionCalculations. The associated output 120' returned after this selection is the value from the cell in the selected workbook named Commission_YTD. According to the second rule, if the value of the position attribute is strategic account manager, the selection module 215 selects the parameterized workbook 105' SAM_ProductLineCommissionCalculations. The associated output 120' returned after this selection is the value from the cell in the selected workbook named Commission_YTD. Although the exemplary embodiment above uses two rules and a decision tree, it is understood that the system can employ other selection rules and mechanisms to select a concrete workbook 105' from the set 220.

Figure 3:
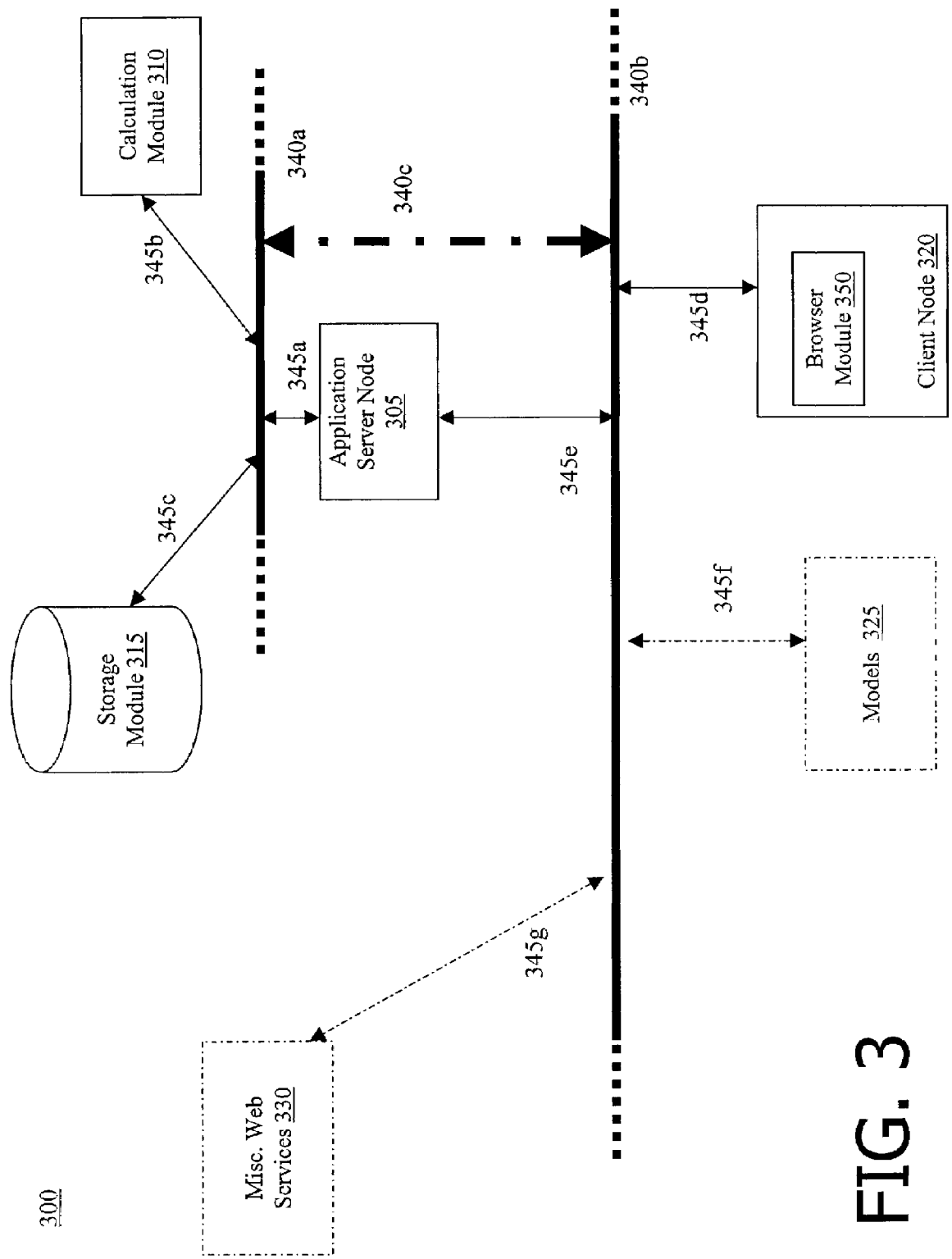
FIG. 3 is a block diagram of an illustrative embodiment of a system to generate and use parameterized workbooks in accordance with the invention.

In broad overview, FIG. 3 illustrates an embodiment of a system 300 to generate and use parameterized 105 and virtual 205 workbooks in accordance with the invention. The system 300 includes an application server node 305, a calculation module 310, a storage module 315 and a client node 320. The system 300 can optionally include models 325 and miscellaneous Web services 330.

The application server node 305, the calculation module 310 and the storage module 315 communicate with each other via a network 340*a* using communication channels 345*a*, 345*b*, and 345*c*, respectively. The client node 320 communicates with the application server node 305 via a network 340*b* using communication channels 335*d* and 335*e*, respectively. The networks 340*a* and 340*b* can also be part of the same network 340 as shown with optional connection 340*c*. If optional connection 340*c* is included, then one of the application server node's 305 communication channels 345*a* or 345*e* can be eliminated. If the models 325 and the miscellaneous Web services 330 are included in the system 300, they communicate with the network 340*b* using communication channels 335*f* and 335*g*, respectively. The networks 340*a*, 340*b* and 340*c* are generally referred to as 340. The communication channels 345*a*, 345*b*, 345*c*, 345*d*, 345*e*, 345*f* and 345*g* are generally referred to as 345.

For example, the networks 340 and the communication channels 345 can include and/or be part of an internal bus, a local-area network (LAN), such as a company Intranet, a wide area network (WAN) such as the Internet or the World Wide Web and/or the like. The networks 340 and the communication channels 345 represent, for example, standard telephone lines, LAN or WAN links (e.g., T1, T3, 56 kb, X.25), broadband connections (ISDN, Frame Relay, ATM), wireless connections (cellular, WLAN, WWAN, 802.11) and/or the like. The connections can be established and data can be exchanged using a variety of communication protocols and languages (e.g., HTTP(S), TCP/IP, SSL, PPTP, HTML, XML, SOAP, IPX, SPX, NetBIOS, Ethernet, RS232, direct asynchronous connections, VPN protocols, a proprietary protocol, a proprietary language and/or the like). In one embodiment, the servers 305, 310 and 315 and the client 320 encrypt all communication when communicating with each other.

Each of the servers and modules 305, 310 and 315 can be any computing device capable of providing the services requested by the other servers and modules or by the client node 320. Particularly, this includes generating and processing parameterized workbooks as described herein. For clarity, FIG. 3 depicts server node 305 as an entity separate and distinct from modules 310 and 315, and each node 305, 310 and 315 can independently be in communication with the network 340*a*, representing that the nodes 305, 310 and 315 are logically independent. It is to be understood, however, that the nodes 305, 310 and 315 can also be implemented individually or in any combination, for example, on a single server, distributed on portions of several (i.e., more than two) servers, and/or as part of a single server node or server farm in communication with the network 340*b* through, for example, a single Web server (not shown).

The client node 315 can be any computing device (e.g., a personal computer, set top box, wireless mobile phone, handheld device, personal digital assistant, kiosk, etc) used to provide a user interface to access the application server 305. The client node 320 can include a browser module 350.

A user can use the system 300, inter alia, to generate and process parameterized 105 and virtual 205 workbooks. Two objectives of the present invention are to simplify the creation and maintenance of large spreadsheet-based computation models and to allow those models to be computed without manual intervention. The system 300 facilitates these objectives by storing tracking information about workbooks, including their parameters 110, parameter types and dependencies in the storage module 315. In one embodiment, the system 300 stores this information as a workbook information database. The workbook information database tracks and controls the names and storage locations of all parameterized 105 and virtual 205 workbooks used in the system 300. The database records information about the parameters 110 and parameter types and outputs 120 and output types of each workbook (e.g., 105, 205) and the dependencies between workbooks that exist when one workbook refers to another workbook using a formula. Each workbook instantiation may depend on one or more instantiations of the same workbook or of other workbooks. The dependency information allows the system 300 to perform workbook computations without manual intervention, for example in an application server 305 environment, because the system 300 can determine all dependent workbooks, open them, instantiate them and resolve all linkages between the workbooks appropriately. Table 1 represents an embodiment of parameter and where-used data stored in the workbook information database.

TABLE 1

| Workbook: | Name: | DM_Sales_Rank |
| | Location: | /workbooks/DM_Top_Performers.xls |
| Associated Parameters: | | |
| Name: | Type: | Restriction: |
| Person | Class Person | none |
| Period | Class Period | type = Year |
| MonthIndex | Enumeration[1 . . . 12] | none |
| Associated Outputs: | | |
| Name: | Type: | Cell: |
| TopRank | Number | MaximumRank |
| Dependencies: | | |
| Dependency Type: | Description: | |
| Workbook Output | CommissionCalculations, output YTDCommission | |
| Data Query | PeopleByManager | |

As shown in Table 1, the database stores the name, the type and any restrictions of the parameters 110 associated with the represented workbook. The names of parameters associated with the represented workbook are person, period and monthindex. Each parameter has a defined type. Class person and class period are class types that define the attributes associated with the respective parameter. Enumeration is an index type that associates an index with a corresponding calendar month. The restrictions data notes any restrictions on the parameters associated with this workbook and in this example, there is a restriction on the value of the parameter period to be stated as a year.

In the Table 1 example, the database also stores the name, the type and reference information on all defined outputs of the represented workbook. The names of the defined output shown is TopRank, which is mapped to a cell named MaximumRank within the workbook.

In the Table 1 example, the database also stored data on dependencies of the workbook on other workbooks or external data sources. There are two dependencies shown. One dependency shows that the represented workbook calculation depends on the output of a calculation from another workbook, the YTDCommissions output of the CommissionCalculations workbook. The second dependency indicates that the represented workbook uses a data range that depends on a named data query People By Manager.

In one embodiment, the workbook information database also tracks multiple versions of workbooks (e.g., 105, 205) as they are created and modified over time. This version information provides a historical record of changes, allows changes to be rolled back, and can provide for stability of prior computations (changes to a workbook do not necessarily have to affect existing computations, which can continue to use the previous version of the workbook at the user's discretion). The system 300 can also use version tracking of workbooks to limit the visibility of certain workbook versions to particular people. For example, a new workbook version might be visible only to a set of "approvers" as part of a formal approval process. Once the new version has been approved, it is then made visible globally and affects the computations seen by everyone. Table 2 represents an embodiment of version data stored in the workbook information database.

TABLE 2

| | | Versions: | | |
|---|---|---|---|---|
| Branch: | Version: | State: | Effective: | Labels: |
| Main | 1 | Published | Anytime | None |
| Main | 2 | Unpublished | 08/01/02 | None |

The Table 2 example stores the version data for the represented workbook, including the branch, the version number the state of the version, the effective date of the version and any associated labels of the version. The branch values represent named branches within the version graph of the workbook. The version number is an ID for each version relative to its branch. Thus, a particular workbook version is uniquely identified by a combination of its branch name and version number. The state values represent whether the cached data associated with that workbook version has been published (e.g., available to users to view and/or edit). The effective value represents the time frame in which the version is valid. The labels values represent user-defined names that can be assigned to individual workbook versions.

The workbook information database also tracks information about the data sources used by each workbook (e.g., 105, 205). This information is used to detect when workbook results 120 are out of date and to efficiently recalculate the workbooks. For every reference in a workbook to external data, the system 300 records information in the workbook information database that represents a predicate describing the set of external data upon which the workbook computation depends. This predicate may be based, in part, on the values of workbook parameters 110. In other words, the results of different instantiations of the workbook may depend upon different sets of external data.

The system 300 may monitor each data source to detect changes to the data source, using the information in the workbook information database to determine which workbook instantiations are affected by any change. Several different means may be used to monitor the data source.

Data sources can include both internal and external data sources. An internal data source is a database (or other data storage mechanism) that is accessed only through the system 300. All changes to data in an internal data source are made through interfaces provided by the system 300 and these update interfaces can perform the necessary monitoring of the data source. An external data source is one that is not under the exclusive control of the system 300 and can be updated through other interfaces. For external data sources, the system 300 can use known techniques such as database triggers, database polling and/or data timestamps to provide similar levels of monitoring functionality. In the case of external data sources, the application server 105 is the active agent responsible for monitoring the external data source. The system 300 can use mechanisms used to monitor external data sources to monitor internal data sources as well.

By analyzing the computations and data dependencies within each workbook (e.g., 105, 205), the system 300 can in many cases optimize the data source monitoring required. For example, a particular workbook (e.g., 105, 205) may have a parameter 110 that is a time period (perhaps a calendar month). Analysis of the workbook computation may reveal that an instantiation of the workbook only depends on data for the month specified by the parameter. The data source monitoring subsystem can then optimize by remembering which months have had data updates and only recalculating workbook instantiations that depend on those months. If data updates to prior months are rare, this avoids many unnecessary calculations when referring to historical data.

An alternative or additional method the system 300 can use tracks data source dependencies and dependencies of one workbook instantiation on other workbook instantiations by observing and recording the data requests made by the referencing workbook and the results of these data requests. The system 300 compares this recorded data against newly computed data in the future to determine whether a workbook instantiation needs to be recalculated.

A third method the system 300 can use allows the user to supply surrogate tests for determining when a workbook instantiation needs to be recalculated. For example, the user may specify that instantiations of particular workbooks for prior periods should only be recalculated when specifically requested by the user and should be treated as up to date in all other situations.

In the system 300, a server processing component (not shown) or an auxiliary agent processing component (not shown) can perform data source monitoring. In one embodiment, these components are always active (or are started on demand by other components, such as a database server, which is always active). This allows the system 300 to monitor data source changes without the need for human intervention, unlike existing spreadsheet applications.

The system 300 supports distributing the computational load of evaluating a spreadsheet model (e.g., 100, FIG. 1) across multiple servers (i.e., calculation module 110 represents workbook calculations on multiple servers). By utilizing the workbook dependencies and data source dependencies stored in the storage module 115, as well as other workbook database information, the system 300 can schedule the execution of different workbook instantiations on different server computers.

Exploiting this parallelism improves the speed with which large models can be calculated, either for on-demand calculations or for automatic pre-calculations. Without the ability to perform true distributed processing, computations involving large networks of interconnected spreadsheets can be impractical. Complex models using parameterized 105 and virtual 205 workbooks typically exhibit a large amount of potential parallelism.

Distributed processing of workbook computations depends on the ability of the system 300 to separate the calculation of a referenced workbook from the use of a result from the referenced workbook by the referencing workbook. In one embodiment, the system 300 accomplishes this by utilizing special formula primitives to allow one workbook to refer to a result of another workbook, although other mechanisms are possible.

To perform the distributed workbook calculation component, the system 300 can utilize dependency information recorded in the database for efficiency, but does not need to. The system 300 can also schedule distributed executions of workbook computations dynamically as the computation proceeds. For example, if one workbook (e.g., 105, 205) references outputs 120 from a number of subsidiary workbooks (e.g., 105b . . . 105n), the computation of the subsidiary workbooks can proceed in parallel as long as the parameter 110 values for one instantiation do not depend on the output 120 of a different subsidiary workbook instantiation.

In addition to distributed computing, the system also utilizes caching algorithms and a database of cached computation results to optimize the performance of evaluating large computational models, especially models created as a network of interrelated workbooks. The system 300 stores results 120 and/or other intermediate calculations in the storage module 115 so that these values are not only available after the workbook file has been loaded into the memory of the spreadsheet program and opened. By caching the results in, for example a database, the system 300 can provide faster access and improve the performance of multi-workbook computations. The system 300 may cache values for many different instantiations of the same workbook with different parameter values. The system 300 can also distinguish result values of workbooks that are the values of intermediate computations from subsidiary workbooks performed in the process of instantiating some other workbook and may also cache these result values in the database. These result values or aggregations of these result values, which may come from many different workbooks and workbook instantiations, can then be queried and manipulated using standard database tools. These result values, whether cached or not, can also be accessed through application programming interfaces provided by the system 300, including network-based interfaces such as web services.

The system can perform workbook calculations either on demand (e.g. when a particular result is requested by an end user through a web browser or some other user interface) or automatically by pre-calculating and caching the results of the pre-calculations, using for example a process on the server 305, before they are requested. Automatic pre-calculation improves the interactive performance of the system 300 when users subsequently request these computations. The system 300 can perform these automatic pre-calculations at times when the servers 305, 310, 315 would otherwise be idle.

The system 300 uses information about workbook parameter types and workbook dependencies to determine the set of computations to pre-calculate. Parameter type information determines the set of allowable values for each parameter, and thus the set of all possible instantiations that may be requested for a particular workbook. The set of allowable values for a parameter may depend not only on the parameter type, but also on the state of some data source. So, for example, if a new user is added, then some workbook parameters may now have additional legal values. The data source monitoring of the system 300 detects this change to the data source and may pre-calculate and cache new results for the newly possible instantiations of these workbooks.

The system can perform automatic pre-calculation and caching for intermediate results (e.g. the output of one workbook instantiation, which is used by another workbook instantiation), for results that may be displayed for the user, and/or for a set of aggregated result values that are cached so that they can be efficiently queried. Aggregated result values might include time series or multi-dimensional data, such as daily gross profit broken down by region and product line.

The system 300 can use several different factors to decide which values should be precalculated and cached. One factor, for example, is information available within the system 300 about dependencies between workbooks and the size of individual computations. As described above, this information can be stored in the storage module 315, in for example a database. The system 300 uses this information to estimate the potential cost savings for pre-calculating particular computations. Another factor, for example, is historical access patterns and frequency of data accesses (e.g., including web page hits), which provides predictive information about the demand for particular data values or workbook instantiations in the future. A third factor, for example, is user specified instructions about which workbook instantiations to pre-calculate and which data values (including aggregated result values) to cache.

FIG. 4 illustrates an embodiment of a screen shot 400 of a specific example of parameterized workbook 105 (FIG. 1) that the system 300 (FIG. 3) can generate and process in accordance with the invention. The screenshot 400 includes a first portion 405 indicating the name of the workbook containing the associated spreadsheet formulas and a second portion 415 indicating an exemplary formula used for producing descriptive text based on the workbook parameters 110 and a third portion 420 showing the resulting descriptive text displayed in a cell. The screenshot 400 also includes a fourth portion 425 illustrating tabular data calculated using a data range. The table 425 includes a prototype range 430 and five columns 435a, 435b, 435c, 435d and 435f. The screenshot 400 also includes a fifth portion 450 illustrating results 120 in a graphical format.

In this example, the name of the parameterized workbook 105 represented by this screenshot 400 is DM_Sales_Rank, representing a ranking of all people reporting to a particular district manager who is identified by a person parameter of the workbook. To generate this parameterized workbook 105, the system 300 instantiates workbook module 115 named DM_Top_Performers.xls, as indicated by the first portion 405.

The equation in the second portion 415 uses the parameters 110 "person" and "period" as part of the formula. When the system 300 instantiates the workbook, the system 300 binds the value of the parameters person and period sent with the call to generate that instance. The result of the formula is a descriptive text string based on the workbook parameter values, shown in a cell in the third portion 420.

In this example, the system 300 generates the table 425 using a data range. A data range, as used herein, is a spreadsheet extension that associates a data query with a variable sized set of workbook cells. The features of the data range of the system 300 provide facilities for performing automated, data-driven spreadsheet calculations based on variable input data.

A data range of the system 300 associates a parameterized data query with a range of workbook cells. Each data query parameter is identified by name and/or position. Each query parameter has a type that constrains the allowable values for the parameter. Queries are expressed in a textual syntax that a user and/or administrator creates. A data range can also refer by name to a pre-defined query. A data range defines a set of query parameter value expressions using the spreadsheet formula language. There is one expression for each required query parameter in the query. The system 300 uses the results of these expressions as the values of the query parameters when the system 300 evaluates the data range query.

In general overview, a data range can include a prototype range, a replication direction, an output range, an output range name, a sorting specification and a row insertion specification. The prototype range specifies a set of "template" cells that the system 300 replicates once for each set of results (or row) the query returns. The prototype range is usually one cell high (or alternatively one cell wide), but it can also be rectangular. The replication direction indicates whether the cells from the prototype range are replicated downwards or to the right. The output range is the set of cells that are populated after the system 300 evaluates the data range by replicating the formulas from the prototype range once for each set of results (or row) from the data range query. The output range is of variable size, depending on the query results, which in turn depend on the values of the query parameters, which in turn usually depend, directly or indirectly, on the parameters to the workbook containing the data range. The creator of a data range does not provide formulas for cells in the output range, the formulas for these cells and the resulting cell values are computed by the process of replicating the formulas from the prototype range. When the prototype range is replicated, formatting information is replicated as well as cell formulas. Therefore, the prototype range controls the visual presentation of the data range as well as the calculated values.

The system 300 binds the output range name to the output range of the data range after each time the data range is modified or re-evaluated. This mechanism facilitates writing formulas that extract selected data from the data range without depending on the size of the data range, because formulas can refer to the range through this name rather than referencing a fixed set of cells that can change over time. The output range name is optional. The sorting specification lists one or more columns (or rows) of the data range and for each column whether the column should be sorted in ascending or descending order. The sorting takes place after the system 300 evaluates the formulas for each cell in the output range and is based on the result shown in each sorted cell of the output range. This post-evaluation sorting is independent of, and in addition to, any pre-evaluation sorting performed by the query associated with the data range. The sorting specification is optional. The row insertion specification controls the behavior when the output range grows and shrinks. The row insertion specification determines whether cells are either (a) inserted and deleted as the range grows and shrinks or (b) overwritten and cleared as the range grows and shrinks. In addition, in case (a), the row insertion specification indicates whether the entire set of rows or columns outside of the data range is replicated when the data range is evaluated or just the cells within the data range itself.

In other embodiments, the data range can include other aspects. These other aspects can include options for handling special cases, such as when the query returns zero rows or one row. For example, when a query returns zero rows, the prototype range can be hidden (so that it occupies no space in rendered output) or the prototype range can display as blank fields independent of the values produced by the formulas in the prototype range. Other aspects can include options for formatting the data range as a whole, such as borders to apply to the entire data range or striping effects created by alternating the background colors on each row of the output range as shown in the table 425 in FIG. 4. Other aspects can also include options for special rendering of the data range in particular output formats. For example, the data range might render in HTML in a manner that allows the user to sort or pivot the data range or otherwise interact with and/or change the data range or how it is displayed in a web browser 350.

In general overview, to evaluate a data range, the system 300 evaluates each parameter value expression for the data range query. The system 300 then evaluates the query itself. The query expression may depend on the parameter value expressions, which may in turn depend on other cells in the workbook and (directly or indirectly) on the workbook parameter values. The query evaluation returns a set of rows, where each row contains multiple values. Each value in a row is identified by a name (the same names are used for the corresponding values in each row). The values may have a variety of data types, including, for example, numbers, strings, dates and references to complex objects.

For each row the query returns, the system 300 replicates the prototype range, either downward or to the right, depending on the replication direction. To replicate a cell, the system 300 evaluates the formula from the prototype cell in the context of the new cell, with the same behavior as if the user had copied the cell. In addition, formulas within a data range can refer to the named values of the current row by using the names as defined workbook names for the duration of the evaluation of the formula. When replicating a cell in a data range, the system 300 also replicates the formatting associated with the cell.

Referring back to the FIG. 4 example, the data range for the table 425 is associated with a named query, for example, a PeopleByManager query, which is a predefined query taking as parameters a person and a time period. The parameter expressions for this data range (not shown) simply pass the corresponding workbook parameters as the parameters values for the query. This query returns a set of rows with two values in each row, an "EMPLOYEE" value and a "POSITION" value. The "EMPLOYEE" value is a unique identifier for a complex person object reporting to this manager, which is Abraham Lincoln as indicated in portion 420. The "POSITION" value is a string indicating the person's position within the organization (e.g. "Sales Rep"). The prototype range 430 consists of cells A19 to F19, which are formatted to be green in this example. Cell A19 contains the formula =PersonName(EMPLOYEE). This formula uses a system accessor function (PersonName) to return the full name of the employee object in each row. The resulting names fill column 435a within the data range. Cell B19 contains the formula=NVQuantity("Quota", EMPLOYEE, Year(period)). This formula uses a system spreadsheet extension (NVQuantity) to return a calculated value (i.e., the current employee's quota) for the year containing the period parameter to the workbook itself. In this case, the system 300 retrieves the Quota quantity by retrieving a value from a database. It is noteworthy that this formula refers to both a workbook parameter (i.e., period) and a named value in the row (i.e., EMPLOYEE). The system 300 displays the corresponding value for each selected employee within the data range in column 435*b*. Cell E19 contains the formula=NVQuantity("Commission-EarnedYTD", EMPLOYEE, period). This formula references a value calculated, in this case, as the output of another parameterized workbook 105. The system 300 displays the computed value for each selected person within the data range in column 425*e*. The formula in cell F19 contains the expression =E19/C19. This expression calculates the ratio between the person's year to date commission and their total sales. This formula uses relative references to perform this calculation. As the system replicates this formula in the output range, the system preserves the relative references so that the system 300 calculates the ratio correctly in each row.

It is understood that a creator of a workbook can reference the system formula language extensions (e.g., PersonName and NVQuantity) in any cell in a parameterized 105 or virtual 205 workbook, not only in cells within a data range. The process of evaluating a data range or the process of evaluating a formula containing a system formula language extension may cause the system 300 to perform further processing. For example, a reference to a quantity such as CommissionEarnedYTD, which is implemented as the output 120 of another workbook (e.g., 105, 205), may cause the system 300 to instantiate other workbooks (recursively) as a consequence of instantiating the original workbook.

When an output 120 from another workbook (e.g., 105, 205) is needed, the system 300 instantiates the workbook unless a cached value for the required output 120 is available and up to date. The system 300 searches the storage module 315 to determine if such a cached value is available. If so, then the system determines whether any dependencies of the cached value have changed since the value was cached. Dependencies of the cached value include the workbook that calculated the value, any queries or external references, such as NVQuantity expressions made during the instantiation of the workbook that produced the cached value, and any outputs from other workbooks that were consumed by the workbook that calculated the value. The system 300 can use various methods to circumvent full dependency checks, including, for example, user specified rules defining how often to update cached values.

If a given quantity has no cached value or the cached value is not up to date, then the system 300 instantiates the target workbook. After the target workbook is instantiated, the system 300 retrieves the designated output 120 from the workbook instantiation and then caches the updated result if caching is enabled for the specified system quantity. A workbook output 120 may be specified by cell coordinates (e.g. Sheet "Summary", cell B10) or more typically by referring to a named workbook quantity within the workbook (e.g. "YTDCommission"). The named quantity typically refers to a predefined cell within the workbook that contains the desired output value, but it may also refer to a range of cells or other kinds of system formula language expressions. Each workbook may specify several different outputs, and the system cache maintenance module may choose to cache multiple outputs from the workbook instantiation even though only one output from the instantiation was originally requested. The system 300 may need these other cached output values for other system calculations.

In the example, the data range in the DM_Top_Performers workbook requests year-to-date commission numbers for each employee reporting to the specified manager (i.e., Abraham Lincoln). This results in a variable number of workbook instantiations. The system may find some of the requested outputs cached in the storage module 315 and may have to recompute others. The creator of the Commission-EarnedYTD quantity can implement that quantity by a set of virtual workbook rules that selects different workbooks for different sets of input parameters. In the example, the system 300 may calculate commissions for sales reps by one workbook while calculating commissions for district managers by a different workbook. For each workbook that needs to be instantiated, the application server 305 schedules the calculation of the workbook. The calculation of workbooks may be spread over multiple calculation server processes 310 running on multiple machines.

To further improve interactive performance, it is often useful to precalculate sets of system quantities that are frequently referenced. For example, it can be useful to precalculate some quantities at night after daily sales transactions have been posted. The system 300 utilizes the type system to guide precalculation. For example, the CommissionEarnedYTD quantity has a person parameter and a month parameter. It is possible to run an automated precalculation of this quantity for all people (or alternatively for Sales Reps in Europe) for the current month.

For example, as described above, cell C19 of the table 425 contains the formula=NVQuantity("SalesCredits", EMPLOYEE, period). The system can precalculate and cache the sales credits for each employee for each year. The entries for this quantity are shown in Table 3. As shown in Table 3, the system 300 stores the data using the ID attribute of a person type parameter.

TABLE 3

| | Period | | | | |
|---|---|---|---|---|---|
| ID | 1998 | 1999 | 2000 | 2001 | 2002 |
| nfasth | 1000000 | 1500000 | 1700000 | 1200000 | 1200000 |
| acabrera | 1200000 | 1900000 | 2200000 | 1500000 | 1500000 |
| jolazabal | 1900000 | 2900000 | 3400000 | 2400000 | 2400000 |
| ascott | 1200000 | 1900000 | 2200000 | 1500000 | 1500000 |
| jhaas | 2200000 | 3300000 | 3900000 | 2800000 | 2800000 |
| sflesch | 1500000 | 2300000 | 2600000 | 1900000 | 1900000 |
| checkman | 500000 | 800000 | 900000 | 700000 | 700000 |
| bmay | 1800000 | 2600000 | 3100000 | 2200000 | 2200000 |
| ksutherland | 1100000 | 1700000 | 2000000 | 1400000 | 1400000 |
| sstricker | 1500000 | 2300000 | 2600000 | 1900000 | 1900000 |
| fcouples | 1900000 | 2800000 | 3300000 | 2300000 | 2300000 |
| sames | 1900000 | 2800000 | 3300000 | 2300000 | 2300000 |
| xcarter | 1700000 | 2500000 | 2900000 | 2100000 | 2100000 |

Figure 5:
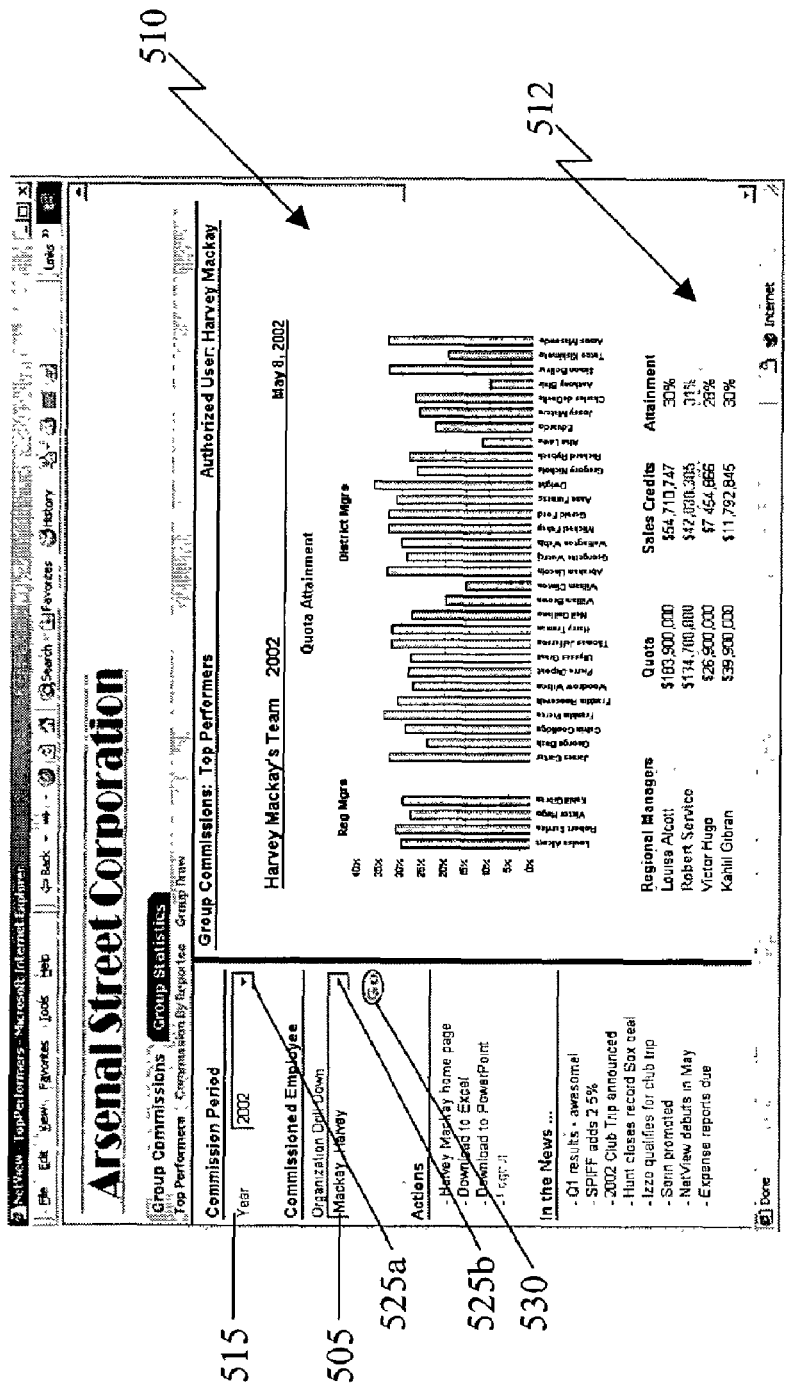
FIG. 5 is screen shot of an illustrative embodiment of a report generated using a virtual workbook in accordance with the invention.

FIG. 5 illustrates an embodiment of a screen shot 500 of a specific example of virtual workbook 205 (FIG. 2) that the system 300 (FIG. 3) can generate and process in accordance with the invention. Using the network browser module 350 (FIG. 3) (e.g., a web browser) on a client device 320 (FIG. 3), a manager (e.g., Harvey Mackay 505) can log in to the application server 305 (FIG. 3) and request a summary report 510, including a table portion 512. The manager typically specifies the period of interest 515, or, in one embodiment, the period defaults to the current year. A virtual workbook 205 implements the report 510. A virtual workbook 205 selects a particular concrete workbook 105' based on rules associated with the definition of the virtual workbook. The rules are based on the parameters of interest, in this case, the manager 505 and the period 515 for which the report is requested. The rules can also utilize globally available information, such as the identity of the user who is logged in, the current date, and the like. The application server 305 processes the rules defining the virtual workbook and selects a particular concrete workbook, for example, RegMgr_MonthlySummary. The concrete workbook is then instantiated by the calculation server 310 and the print area, or an alternatively specified output range, of the specified worksheet within the workbook is rendered as, for example, HTML and returned to the network browser 350. The system 300 can also render this returned data in many different formats besides the standard HTML. To allow the user to organize this returned data by user preference, the system 300 can make this data interactive.

For example, as illustrated in FIG. 5 the summary report 510 includes a table portion 512 representing a data range, similar to the data range of table 425 (FIG. 4) described above. The system 300 renders a data range in different output formats (e.g., HTML) in such a way as to provide partial interactivity. Table portion 512 illustrates an example of an HTML rendering of a data range that is interactive. The creator of a spreadsheet containing a data range (e.g., table 425) is not necessarily the same person who might view an instantiation of the spreadsheet (e.g., table portion 512) through a network browser 350. Using system 300, the creator of the spreadsheet can define the data range 512 to have certain interactive features when a user views that data range 512. These interactive features allow some operations on the data, but not necessarily all of the operations available to the creator of the data range, since the creator is working through a different interface, for example the interface shown in FIG. 4.

For example, the system 300 can allow sorting of columns of the data range 512 when rendered in a network browser 350, for example by clicking with a mouse, using keystrokes and/or other user input. This allows the viewer of the information to sort the table in ascending or descending order based on the alpha/numeric entries of a selected column. As another example, the rows of a data range might be grouped in a hierarchy, for example, a geographical hierarchy of continents, countries and states or provinces. The creator can define the data range so that the system 300 allows a user to interactively expand and collapse the hierarchy using, for example, mouse clicks, keystrokes and/or other user input.

To instantiate the RegMgr_MonthlySummary workbook, the calculation server 310 binds the workbook parameters to their corresponding values (e.g. "person" to "Harvey Mackay" and period to "2002"). Then the calculation server 310 evaluates all formulas in the workbook to ensure they are up to date. In one embodiment, the system 300 implements the workbook parameters 110' as named quantities within the workbook and workbook formulas can refer to these names directly. As illustrated, a user can also change parameter values using the pull-down menus 525a and 525b. In response to changing the parameter values and clicking on the "GO" button 530, the system 300 will re-evaluate the virtual workbook 205, selecting a concrete workbook 105', which may be the same as the prior concrete workbook (RegMgr_MonthlySummary) or may be different. The concrete workbook is then instantiated and rendered as described above using the changed parameter values.

It is also possible to access system quantities through interfaces other than by requesting reports through a web browser 350. For example, the system 300 allows exposure to quantities via web services 330. One web service 330 can be defined, for example, to return a matrix of monthly commission payments for a particular year for a certain set of people, based on the person's role and the territory structure of the company. An invocation of this web service 330 might return all commission payments for 2002 for Territory Managers in North America.

A number of embodiments of the invention have been described. Nevertheless, it will be understood that various modifications may be made without departing from the spirit and scope of the invention. For example, processing can be distributed in many different configurations, additional parameters can be defined and additional types of computations can be modeled. Accordingly, other embodiments are within the scope of the following claims.

What is claimed is:

1. A method for utilizing a spreadsheet, the method comprising:
    defining a parameter external to the spreadsheet;
    associating the parameter with the spreadsheet at design time to define a parameterized workbook, wherein the parameter applies to the spreadsheet as a whole, thereby allowing any formula in the spreadsheet to reference the parameter;
    receiving a value for the parameter at run time;
    computing cell values in the spreadsheet that are dependent, directly or indirectly, on parameter; and
    rendering an output based on the computed cell values.

2. The method of claim 1, wherein associating the parameter further comprises:
    storing a location of the spreadsheet; and
    storing a name for the parameter in the same storage module as the location.

3. The method of claim 1, further comprising:
    defining a named result external to the spreadsheet, wherein the named result references one or more cells within the spreadsheet.

4. The method of claim 3, further comprising:
    generating the named result based at least in part on the received value and the spreadsheet.

5. The method of claim 3, further comprising:
    defining a format for the named result.

6. The method of claim 5, wherein the defined format further comprises a visual rendering of the one or more cells referenced by the named result.

7. The method of claim 6, further comprising:
    creating a visual rendering of any charts or graphics associated with the one or more cells referenced by the named result.

8. The method of claim 1, further comprising:
    associating a type with the parameter at design time, wherein the type defines a range of values that are allowable to be received for the parameter at run time.

9. The method of claim 1, further comprising:
    associating a type with the parameter at design time, wherein the type defines attributes associated with the parameter, wherein the attributes are allowable to be used by formulas within the spreadsheet.

10. The method of claim 1, further comprising:
    defining a formula within the spreadsheet at design time using the parameter.

11. The method of claim 1, wherein the parameterized workbook is a first parameterized workbook, the method further comprising:
    defining a second parameterized workbook; and
    referencing a named result from the second parameterized workbook in a formula in the first parameterized workbook.

12. The method of claim 11, wherein values for parameters of the second parameterized workbook are determined by formulas contained in the first parameterized workbook.

13. The method of claim 1, further comprising:
storing, separate from the spreadsheet and after the spreadsheet closes, an intermediate value used in a calculation for the spreadsheet; and
associating the intermediate value with the parameterized workbook and a value of the parameter used to calculate the intermediate value.

14. The method of claim 13, further comprising: automatically calculating a named result associated with the parameterized workbook without opening the spreadsheet by using the stored intermediate value.

15. The method of claim 1, further comprising:
distributing calculations of the spreadsheet among a plurality of computing devices.

16. The method of claim 15, wherein distributing calculations of the spreadsheet comprises:
distributing the calculations of the spreadsheet among a plurality of computing devices based at least in part on one or more formulas in the spreadsheet.

17. The method of claim 15, wherein distributing calculations of the spreadsheet comprises:
distributing the calculations of the spreadsheet among a plurality of computing devices based at least in part on one or more associations stored in a database associated with the parameterized workbook.

18. The method of claim 1, further comprising:
storing information associated with the parameterized workbook in a parameterized workbook information database that is separate from the parameterized workbook;
storing a location of the spreadsheet; and
storing a list of parameters associated with the spreadsheet.

19. The method of claim 18, further comprising:
storing, separate from the spreadsheet and after the spreadsheet closes, an intermediate value used in a calculation for the spreadsheet; and
associating the intermediate value with the spreadsheet and a list of values for the list of parameters associated with the spreadsheet and used in the calculation of the intermediate value.

20. The method of claim 19, further comprising:
automatically calculating many workbook results by enumerating lists of legal parameter values based on type information associated with each respective parameter.

21. The method of claim 19, further comprising:
automatically calculating a workbook result associated with the spreadsheet without opening the spreadsheet through use of the stored intermediate value.

22. The method of claim 18, further comprising:
storing a list of outputs associated with the spreadsheet.

23. The method of claim 18, further comprising:
storing an association of the spreadsheet to another spreadsheet upon which the spreadsheet depends.

24. The method of claim 23, further comprising:
monitoring the other spreadsheet to detect a change within an output of the other spreadsheet.

25. The method of claim 24, further comprising:
automatically performing a calculation using the spreadsheet in response to detecting the change within the output of the other spreadsheet.

26. The method of claim 18, further comprising:
storing an association of the spreadsheet to a data source upon which a formula in the spreadsheet depends.

27. The method of claim 26, further comprising:
monitoring the data source to detect a change within the data source.

28. The method of claim 27, further comprising:
automatically performing a calculation using the spreadsheet in response to detecting the change within the data source.

29. The method of claim 18, further comprising:
storing version data associated with the spreadsheet.

30. The method of claim 18, wherein the location comprises a network address.

31. The method of claim 18, further comprising:
distributing calculations of the parameterized workbook among a plurality of computing devices based at least in part on one or more stored dependencies of the parameterized workbook on other parameterized workbooks or external data sources.

32. The method of claim 18, further comprising:
distributing calculations of the parameterized workbook among a plurality of computing devices.

33. The method of claim 32, wherein the distribution is based at least in part on one or more formulas in the spreadsheet.

34. The method of claim 32, wherein the distribution is based at least in part on one or more dependencies of the parameterized workbook on other parameterized workbooks or external data sources, wherein the dependencies are stored in a database associated with the parameterized workbook.

* * * * *

US007251776C1

(12) INTER PARTES REEXAMINATION CERTIFICATE (1053rd)

United States Patent
Handsaker et al.

(10) Number: US 7,251,776 C1
(45) Certificate Issued: Feb. 13, 2015

(54) SYSTEM AND METHOD FOR EFFICIENTLY AND FLEXIBLY UTILIZING SPREADSHEET INFORMATION

(75) Inventors: Robert Handsaker, Charlemont, MA (US); Gregory Rasin, Brookline, MA (US); Andrey Knourenko, Waltham, MA (US)

(73) Assignee: NetView Technologies, Inc., Watertown, MA (US)

Reexamination Request:
No. 95/001,809, Nov. 7, 2011

Reexamination Certificate for:
Patent No.: 7,251,776
Issued: Jul. 31, 2007
Appl. No.: 10/193,015
Filed: Jul. 11, 2002

Related U.S. Application Data

(60) Provisional application No. 60/305,217, filed on Jul. 13, 2001.

(51) Int. Cl.
*G06F 17/21* (2006.01)
*G06F 17/24* (2006.01)

(52) U.S. Cl.
CPC .................. *G06F 17/246* (2013.01)

USPC ............................................. 715/212; 715/213

(58) Field of Classification Search
None
See application file for complete search history.

(56) References Cited

To view the complete listing of prior art documents cited during the proceeding for Reexamination Control Number 95/001,809, please refer to the USPTO's public Patent Application Information Retrieval (PAIR) system under the Display References tab.

*Primary Examiner* — Cameron Saadat

(57) ABSTRACT

In one aspect, the present invention relates to utilizing a spreadsheet by defining a parameter external to the spreadsheet and associating the parameter with the spreadsheet to define a parameterized workbook. In one embodiment, this utilization further comprises storing a location of the spreadsheet and storing the name of the parameter in the same storage module as the location. In another embodiment, it includes defining a result external to the spreadsheet, the result referencing one or more cells within the spreadsheet. In another embodiment, this utilization further comprises receiving a value for the parameter and generating the result based at least in part on the value and the spreadsheet. In another embodiment, it further comprises associating a type with the parameter. The type can define a range of values or attributes associated with the parameter.

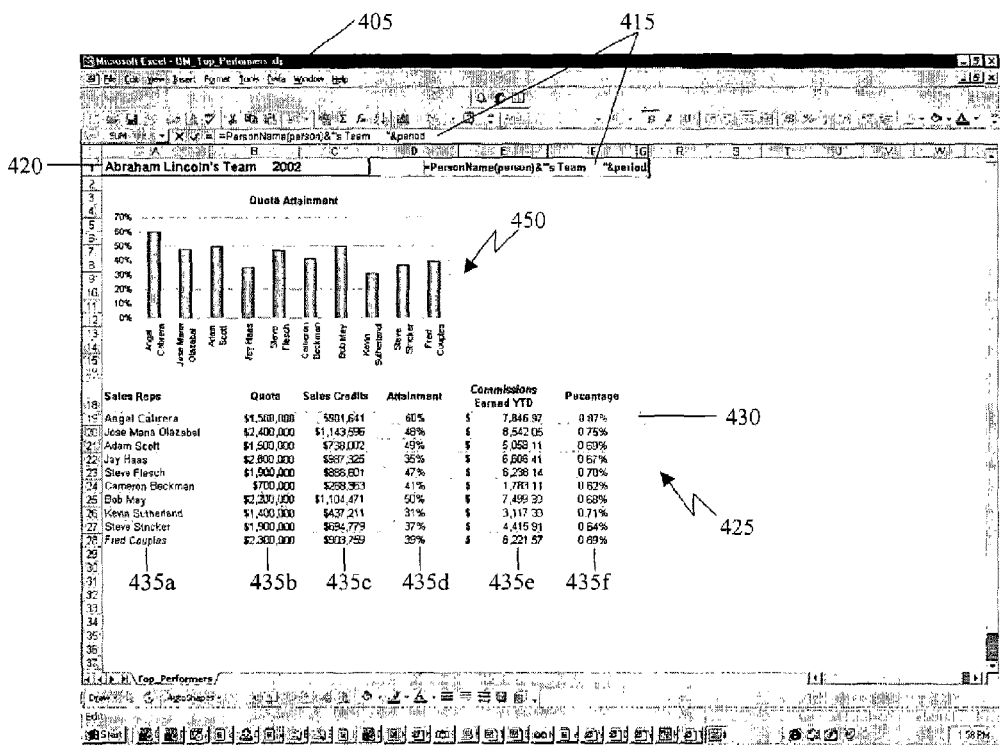

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8, 10, 18, 22, 23, 26 and 30 are cancelled.

Claims 9, 11-17, 19-21, 24, 25, 27-29 and 31-34 were not reexamined.

\* \* \* \* \*